UNITED STATES PATENT OFFICE.

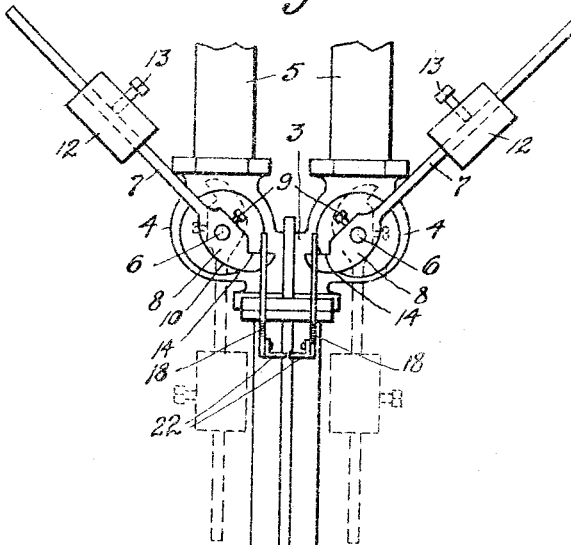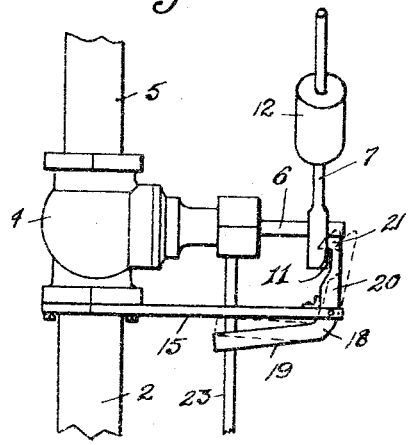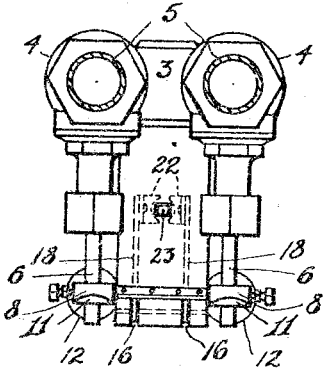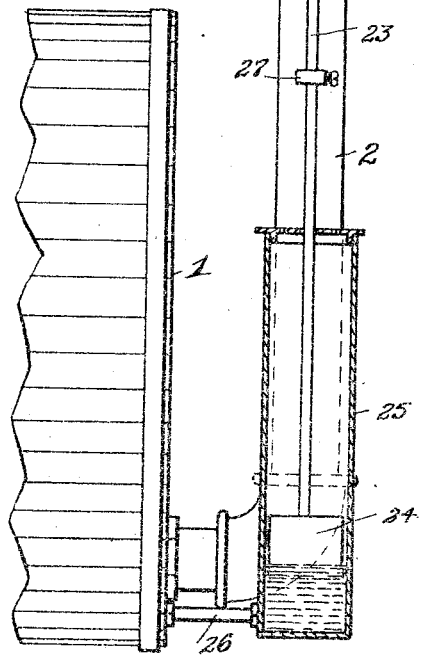

ALBURTON HEWITT, OF SOUTH BEND, INDIANA, AND WALTER V. HEWITT, OF CHICAGO, ILLINOIS.

AUTOMATIC CUT-OFF FOR VALVES.

1,179,431.  Specification of Letters Patent.  Patented Apr. 18, 1916.

Application filed August 20, 1914. Serial No. 857,674.

*To all whom it may concern:*

Be it known that we, ALBURTON HEWITT and WALTER V. HEWITT, citizens of the United States, residing, respectively, at South Bend, in the county of St. Joseph and State of Indiana, and at Chicago, in the county of Cook and State of Illinois, have invented certain new and useful Improvements in Automatic Cut-Offs for Valves, of which the following is a specification.

The invention relates to an improvement in automatic cut offs for valves, comprehending a structure wherein the valve, manually set through the mechanism, is designed for automatic reverse operation.

The improved valve is more or less particularly designed for use in connection with laundry washing tanks, for which reason it is duplex type, so that hot or cold water or a mixture of both may be admitted to the tank, and the valves or valve automatically closed when the liquid in the tank has reached a predetermined level.

The invention in the preferred form of details will be described in the following specification, reference being had particularly to the accompanying drawings, in which:—

Figure 1 is a view in elevation, partly in section, illustrating the improved valve structure in its application. Fig. 2 is a side elevation of the valve structure. Fig. 3 is a bottom plan of the same.

In the particular application of the improved mechanism described, 1 represents a laundry washing tank, or similar receptacle, into which near the bottom leads an upstanding feed pipe 2. Supported upon the upper end of the feed pipe is a valve casing 3, in this instance supporting duplicate valves 4, the valves independently controlling the delivery of fluid from independent supply pipes 5 to the feed pipe 2. By this control hot or cold water, independently supplied through the pipes 5, may be delivered in any proportion, or one without the other, at the will of the user, and as is desirable in use with laundry apparatus.

The present invention is directed more particularly to automatic means for governing the valves upon the fluid supplied reaching a predetermined level in the tank, the structure being adjustable to cut off the supply at any desired level.

Each of the valves is of the threaded type, and the threads thereof are of high pitch, so that a partial rotation of the stem 6 of the valve will serve to open or close the valve in accordance with the direction of rotation. An operating arm 7 is secured upon the stem 6 of each valve, said arm including a body portion 8 formed with an opening to receive the stem, and secured thereon through the medium of a set screw 9, to provide for adjustment of the arm on the stem for a purpose which will later appear. The arm extends beyond the stem toward the opposing valve, and throughout the projected portion is rounded on the lower face as at 10, and beveled on one edge as at 11. The opposing end of the arm is of approximately uniform diameter to slidably receive a weight 12 held thereon through the medium of a set screw 13. The extreme end of the arm opposite the weight carrying end is formed to provide a shoulder or notch 14, acting as the holding element of the arm, as will later appear.

Projecting from the valve casing 3 is a plate 15 underlying the stems 6 of the valves and formed with longitudinally extending slots 16 at the forward end. In these slots are pivotally supported the locking levers 18. These levers are approximately L-shaped, pivotally mounted slightly above the angle, the rearwardly extending arms 19 thereof underlying the plate 15, while the upwardly extending arms 20 terminate in hook portions 21 adjacent the path of movement of the notches 14 of the operating arm. On the relatively inner faces of the terminals of the portions 19 of the levers are semi-circular trip blocks or brackets 22, and the parts are so disposed that when the levers are in normal condition, the semi-circular faces of the trip blocks are opposed, and provide space therebetween for the sliding movement of a stem or rod 23. This rod extends longitudinally of the feed pipe 2, and at its lower end carries a float 24 operating in a chamber 25 extending longitudinally of and in parallelism with the feed pipe, and in open communication with the tank 1 through a pipe 26. Adjustably secured on the rod 23 is a trip collar 27, having a diameter exceeding that of the space between the trip blocks 22.

In operation, the operating arms are so mounted on the stem 6 that when the arms are in their lowered position, as shown in dotted lines in Fig. 1, the valves are closed, the full position indicating open valves. The valves, either or both, are opened by elevating the arms 7 until the shoulders 14 are engaged by the hook 21 of the levers 18. The levers then operate to hold the valve open until the float, with the collar 27 adjusted as desired, rises to a point where the levers 18 are actuated to release the operating arm. The weights 12 then turn the arms to close the valve.

It is obvious that through adjustment of the arm 7 on the stem 6, through the set screws 9, the relative volume of hot and cold water may be regulated, as the rotative movement of one stem will not then be as great as the other when the arms are in their fully raised or latched position.

While primarily designing the device as a control for washing machines, it is of course to be understood that we contemplate the use of the automatic regulator with any type of device with which it may be functionally adapted.

What is claimed is:—

1. A supply system for washing machines, including a feed pipe leading into the tank, independent supply pipes, a valve controlling the fluid from each supply pipe, a weighted arm for operating each valve, a plate supported adjacent both valves, a plurality of levers pivotally mounted in the plate, one terminal of each lever being formed for locking coöperation with an arm to hold the latter against movement under the influence of its weight, the remaining terminals of the levers being disposed adjacent each other, and a float-controlled rod operating between and simultaneously controlling both levers.

2. A supply system for washing machines, including a feed pipe leading into the tank, independent supply pipes, a valve for each pipe, an arm for operating each valve, a weight adjustable on each arm, a plate supported beneath and adjacent each valve, a plurality of angle levers mounted in the plate, one terminal of each lever being formed for locking coöperation with an arm, the remaining terminals of the levers being each formed with trip blocks, the adjacent faces of the blocks being recessed and arranged adjacent together to present an opening, and a float-controlled rod having a stop and operating through the trip-block opening.

In testimony whereof we affix our signatures in presence of two witnesses.

ALBURTON HEWITT.
WALTER V. HEWITT.

Witnesses to signature of Alburton Hewitt:

ARTHUR L. GILLIAN,
GEORGE J. OLTSCH.

Witnesses to signature of Walter V. Hewitt:

A. M. HOTZE,
D. R. INGERSOLL.